US008785072B2

(12) United States Patent
Lee et al.

(10) Patent No.: US 8,785,072 B2
(45) Date of Patent: Jul. 22, 2014

(54) FUEL CELL STACK

(75) Inventors: Jin-Hwa Lee, Yongin-si (KR); Chi-Seung Lee, Yongin-si (KR); Seong-Jin An, Yongin-si (KR); Sang-Il Han, Yongin-si (KR); Kah-Young Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 443 days.

(21) Appl. No.: 12/981,410

(22) Filed: Dec. 29, 2010

(65) Prior Publication Data

US 2011/0305968 A1 Dec. 15, 2011

(30) Foreign Application Priority Data

Jun. 11, 2010 (KR) .................. 10-2010-0055628

(51) Int. Cl.
*H01M 8/24* (2006.01)

(52) U.S. Cl.
USPC ............ 429/450; 429/413; 429/414; 429/457

(58) Field of Classification Search
None
See application file for complete search history.

(56) References Cited

U.S. PATENT DOCUMENTS

2002/0058168 A1* 5/2002 Voss et al. .................. 429/13
2006/0099477 A1 5/2006 Hoffjann et al.

FOREIGN PATENT DOCUMENTS

| JP | 2005-317444 A | 11/2005 |
|---|---|---|
| KR | 10-2003-0018078 A | 3/2003 |
| KR | 10-2009-0088074 A | 8/2009 |

* cited by examiner

*Primary Examiner* — Milton I Cano
*Assistant Examiner* — Carmen Lyles-Irving
(74) *Attorney, Agent, or Firm* — Christie, Parker & Hale, LLP

(57) ABSTRACT

A fuel cell stack includes: a plurality of membrane-electrode assemblies; first and second end plates respectively positioned outside outermost ones of the membrane-electrode assemblies; and a plurality of separators respectively positioned between the membrane-electrode assemblies and between the outermost ones of the membrane-electrode assemblies and the first and second end plates. The first end plate includes an oxidizing agent inlet, an oxidizing agent outlet, and a moisture supplying flow path connecting the oxidizing agent inlet and the oxidizing agent outlet. The moisture supplying flow path includes a first end portion adjacent to the oxidizing agent outlet and a second end portion adjacent to the oxidizing agent inlet, the first end portion being larger than the second end portion and being a different distance away from a surface of the first end plate facing away from the second end plate than the second end portion.

15 Claims, 6 Drawing Sheets

FUEL CELL STACK

CROSS-REFERENCE TO RELATED APPLICATION

This application claims priority to and the benefit of Korean Patent Application No. 10-2010-0055628 filed in the Korean Intellectual Property Office on Jun. 11, 2010, the entire contents of which are incorporated herein by reference.

BACKGROUND (a) Field

The present invention relates to a fuel cell stack. More particularly, the present invention relates to an end plate for a fuel cell stack.

(b) Description of Related Art

A fuel cell system includes a fuel cell stack that generates electrical energy using the electrochemical reaction between a fuel (hydrocarbon-based fuel, pure hydrogen, or reformed gas rich in hydrogen) and an oxidizing agent (air or pure oxygen). A direct oxidation type fuel cell uses a liquid or gas hydrocarbon-based fuel, and a polymer electrolyte type fuel cell uses pure hydrogen or a reformed gas rich in hydrogen.

The fuel cell stack includes membrane-electrode assemblies (MEAs), separators positioned between the membrane-electrode assemblies and supplying a fuel and an oxidizing agent to the membrane-electrode assemblies, and a pair of end plates positioned outside the outermost separator and pressing the membrane-electrode assemblies and the separators together to fix them as one body.

The end plate generally includes a fuel inlet, an oxidizing agent inlet, a fuel outlet, and an oxidizing agent outlet. The fuel introduced into the fuel inlet is provided to the anode of the membrane-electrode assemblies while passing through a fuel channel of the separator, and non-reacted fuel is discharged through the fuel outlet. The oxidizing agent introduced into the oxidizing agent inlet is provided to the cathode of the membrane-electrode assemblies while passing through an oxidizing agent channel of the separator, and the non-reacted oxidizing agent is discharged through the oxidizing agent outlet.

The oxidizing agent is humidified to a predetermined humidity by using a humidifying device before the introduction of the oxidizing agent to the fuel cell stack, or external air may be introduced as is, without humidifying. However, when using the humidifying device, the volume of the fuel battery system is increased, manufacturing costs are increased, and a water supply source and a pump for supplying the water to the humidifying device are required. Meanwhile, when air that is not humidified is introduced as is, the region that is initially supplied with the oxidizing agent becomes very dry with respect to the cathodes of the membrane-electrode assemblies, such that the membrane-electrode assemblies may be deteriorated.

That is, moisture is generated as a byproduct of the electrochemical reaction inside the fuel cell stack, however the electrochemical reaction is not active in the region that is initially supplied with the oxidizing agent with respect to the cathodes, such that a dry state is maintained. The dry state can cause radicals generated during the operation of the membrane-electrode assembly to be sustained in the membrane-electrode assembly for a long time, such that deterioration of the membrane-electrode assembly may be accelerated.

The above information disclosed in this Background section is only for enhancement of understanding of the background of the invention, and therefore may contain information that does not form the prior art that is already known in this country to a person of ordinary skill in the art.

SUMMARY OF THE INVENTION

The present invention provides a fuel cell stack for preventing or reducing deterioration of the membrane-electrode assembly by increasing a moisture content of an oxidizing agent provided to the fuel cell stack, without substantially increasing a volume of the fuel battery system or manufacturing costs.

A fuel cell stack according to an exemplary embodiment of the present invention includes: a plurality of membrane-electrode assemblies; first and second end plates respectively positioned outside outermost ones of the membrane-electrode assemblies; and a plurality of separators respectively positioned between the membrane-electrode assemblies and between the outermost ones of the membrane-electrode assemblies and the first and second end plates, for supplying at least one of a fuel or an oxidizing agent to the membrane-electrode assemblies. The first end plate includes an oxidizing agent inlet, an oxidizing agent outlet, and a moisture supplying flow path connecting the oxidizing agent inlet and the oxidizing agent outlet. The moisture supplying flow path includes a first end portion adjacent to the oxidizing agent outlet and a second end portion adjacent to the oxidizing agent inlet, the first end portion being larger than the second end portion and being a different distance away from a surface of the first end plate facing away from the second end plate than the second end portion.

The first end plate may be substantially parallel to a ground surface, and a distance between the ground surface and the first end portion may be greater than a distance between the second end portion and the ground surface. The moisture supplying flow path may be include two flow paths having different sizes connected along a length direction of the moisture supplying flow path.

The moisture supplying flow path may include a first flow path having a substantially same size as the first end portion, and a second flow path connected to the first flow path and having a substantially same size as the second end portion. The first flow path and the second flow path may have substantially circular cross-sections. The first flow path and the second flow path may have hydrophobic surfaces.

The moisture supplying flow path may be formed along a substantially straight line at a slope. Lower surfaces of the first flow path and the second flow path may be substantially aligned, and a latch jaw may be formed on an opposite surface of a boundary region where the first flow path and the second flow path are connected to one another. The latch jaw may be substantially perpendicular to a length direction of the first flow path and the second flow path, or the latch jaw may have a slope of less than or equal to 45° with respect to a length direction of the first flow path and the second flow path.

The moisture supplying flow path may be formed such that a central axis of the first flow path and a central axis of the second flow path are substantially aligned with one another, such that a latch jaw may be formed on at least two opposite surfaces of a boundary region where the first flow path and the second flow path are connected. The latch jaw may be substantially perpendicular to a length direction of the first flow path and the second flow path, or the latch jaw may have a slope of less than or equal to 45° with respect to a length direction of the first flow path and the second flow path.

The first end plate may be positioned closer to the ground surface than the second end plate, and the oxidizing agent inlet and the oxidizing agent outlet may be arranged to be diagonal to one another on the first end plate.

A fuel cell stack according to another exemplary embodiment of the present invention includes: a plurality of membrane-electrode assemblies; first and second end plates respectively positioned outside outermost ones of the membrane-electrode assemblies; and a plurality of separators respectively positioned between the membrane-electrode assemblies and between the outermost ones of the membrane-electrode assemblies and the first and second end plates, for supplying at least one of a fuel or an oxidizing agent to the membrane-electrode assemblies. The first end plate includes an oxidizing agent inlet, an oxidizing agent outlet, and a moisture supplying flow path connecting the oxidizing agent inlet and the oxidizing agent outlet. The moisture supplying flow path includes at least two flow paths continuously connected along a length of the moisture supplying flow path and having different sizes, wherein a flow path adjacent to the oxidizing agent outlet from among the flow paths is larger than a flow path adjacent to the oxidizing agent inlet from among the flow paths.

A first flow path may include the flow path adjacent to the oxidizing agent outlet, and a second flow path connected to the first flow path may include the flow path adjacent to the oxidizing agent inlet, wherein the first flow path and the second flow path may have circular cross-sections. The first flow path and the second flow path may have hydrophobic surfaces.

The moisture supplying flow path may include a latch jaw at a boundary region where the first flow path and the second flow path are connected, and the latch jaw may have a slope of less than or equal to 45° with respect to a length direction of the first flow path and the second flow path.

The fuel cell stack according to exemplary embodiments of the present invention recycles moisture of the discharged oxidizing agent by using a moisture supplying flow path, such that a humidity of the supplying oxidizing agent may be increased. As a result, the whole membrane-electrode assembly may be maintained with appropriate humidity, such that deterioration of the membrane-electrode assembly may be suppressed or reduced, and the generating efficiency and life-span of the fuel cell stack may be improved. Also, the fuel cell stack does not include an additional humidifying device, such that a volume of the fuel battery system is small, manufacturing costs may be decreased, and an increase in a number of components may be minimized.

DESCRIPTION OF SYMBOLS

| | |
|---|---|
| 100: fuel cell stack | 10: membrane-electrode assembly |
| 11: electrolyte- membrane | 12: anode |
| 13: cathode | 20: separator |
| 210: anode separator | 220: cathode separator |
| 21: fuel channel | 22: oxidizing agent channel |
| 31, 32: first and second current collecting plates | |
| 41, 42: first and second end plates | |
| 51: fuel inlet | 52: fuel outlet |
| 61: oxidizing agent inlet | 62: oxidizing agent outlet |
| 70, 710, 720, 730: moisture supplying flow path | |
| 71: first end portion | 72: second end portion |
| 73, 731: first flow path | 74, 741: second flow path |
| 75, 751, 752, 753: latch jaw | |

DETAILED DESCRIPTION OF THE EMBODIMENTS

The present invention will be described more fully hereinafter with reference to the accompanying drawings, in which exemplary embodiments of the invention are shown. As those skilled in the art will recognize, the described embodiments may be modified in various different ways without departing from the spirit or scope of the present invention.

Figure 1:
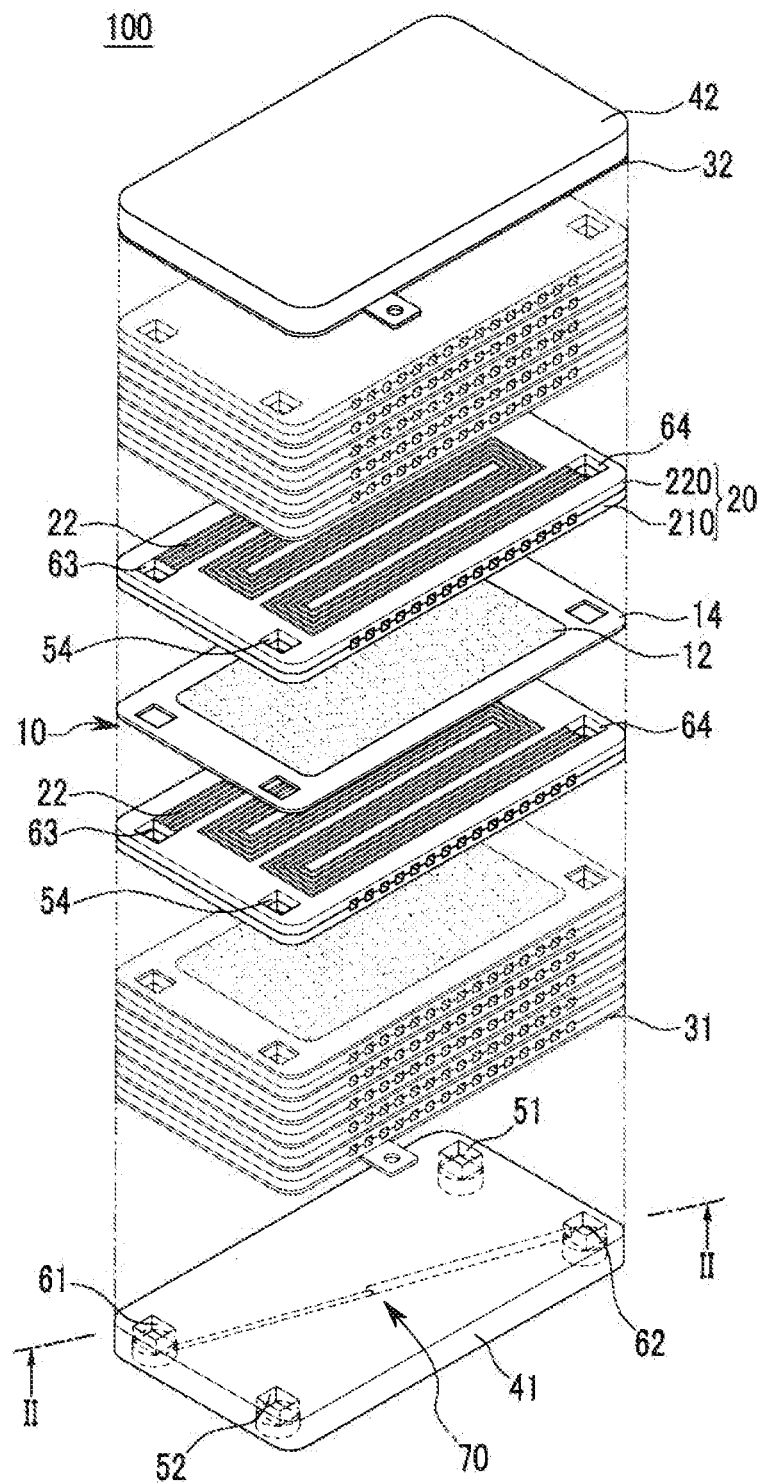
FIG. 1 is an exploded perspective view of a fuel cell stack according to a first exemplary embodiment of the present invention.

FIG. 1 is an exploded perspective view of a fuel cell stack according to a first exemplary embodiment of the present invention.

Referring to FIG. 1, a fuel cell stack 100 according to the first exemplary embodiment includes a plurality of membrane-electrode assemblies 10, a plurality of separators 20 positioned between the membrane-electrode assemblies 10, first and second current collecting plates 31 and 32 respectively positioned outside the outermost separators, and first and second end plates 41 and 42 respectively positioned outside the first and second current collecting plates 31 and 32.

The fuel cell stack 100 is integrally fixed, for example, by a bonding means that is not shown, and the membrane-electrode assembly 10, the separator 20, the first and second current collecting plates 31 and 32, and the first and second end plates 41 and 42 are pressed and held tightly close to each other by the bonding means. The bonding means may include bonding bolts penetrating at least four edges of the fuel cell stack 100 and fixing nuts coupled to the ends of the bonding bolts to tighten the bonding bolts.

The plurality of membrane-electrode assemblies 10 and the plurality of separators 20 form an electrical generator. The membrane-electrode assembly 10 is supplied with fuel and an oxidant through the separators 20, and generates electrical energy by using an electrochemical reaction between the fuel and the oxidizing agent. The separators 20 pressurize and support the membrane-electrode assembly 10, which has relatively weak mechanical strength, and are made of a conductive material, thereby electrically connecting the membrane-electrode assemblies 10 to one another.

The fuel cell stack 100 may be supplied with a hydrocarbonaceous fuel (methanol, ethanol, liquefied petroleum gas, liquefied natural gas, gasoline, butane gas, etc.) in a liquid phase or a gas phase, or may be supplied with cracked hydrogen that is cracked by a reformer from the hydrocarbonaceous fuel or a hydrogen-enriched reformate gas. The fuel cell stack 100 may further be supplied with pure oxygen stored in a separate storage unit as the oxidant, or it may be supplied with external air containing oxygen as is.

The first and second end plates 41 and 42 and the members positioned therebetween may be disposed perpendicular to a ground surface or parallel to the ground surface. FIG. 1 shows an example in which the first and second end plates 41 and 42 and the members positioned therebetween are parallel to the ground surface. In this case, a fuel inlet 51, a fuel outlet 52, an oxidizing agent inlet 61, and an oxidizing agent outlet 62 may be formed on the end plate that is disposed or positioned at a lower side of the stack, from among the first and second end plates 41 and 42 (e.g., the first end plate 41 in FIG. 1).

The fuel and the oxidizing agent are respectively provided to the fuel inlet 51 and the oxidizing agent inlet 61, and the non-reacted fuel and the non-reacted oxidizing agent that passes through the electrical generator are discharged through the fuel outlet 52 and the oxidizing agent outlet 62. The fuel inlet 51 and the fuel outlet 52 are arranged to be diagonal to one another on the first end plate 41, and the oxidizing agent inlet 61 and the oxidizing agent outlet 62 are also arranged to be diagonal to one another.

A moisture supplying flow path 70 connecting the oxidizing agent inlet 61 and the oxidizing agent outlet 62 is formed inside the first end plate 41. The moisture supplying flow path 70 is formed with a very small diameter so as not to influence or affect the flow of the oxidizing agent injected through the oxidizing agent inlet 61 and the non-reacted oxidizing agent discharged through the oxidizing agent outlet 62. The first and second end plates 41 and 42 may be manufactured with an engineering plastic having a thickness of about 20 mm.

Figure 2:
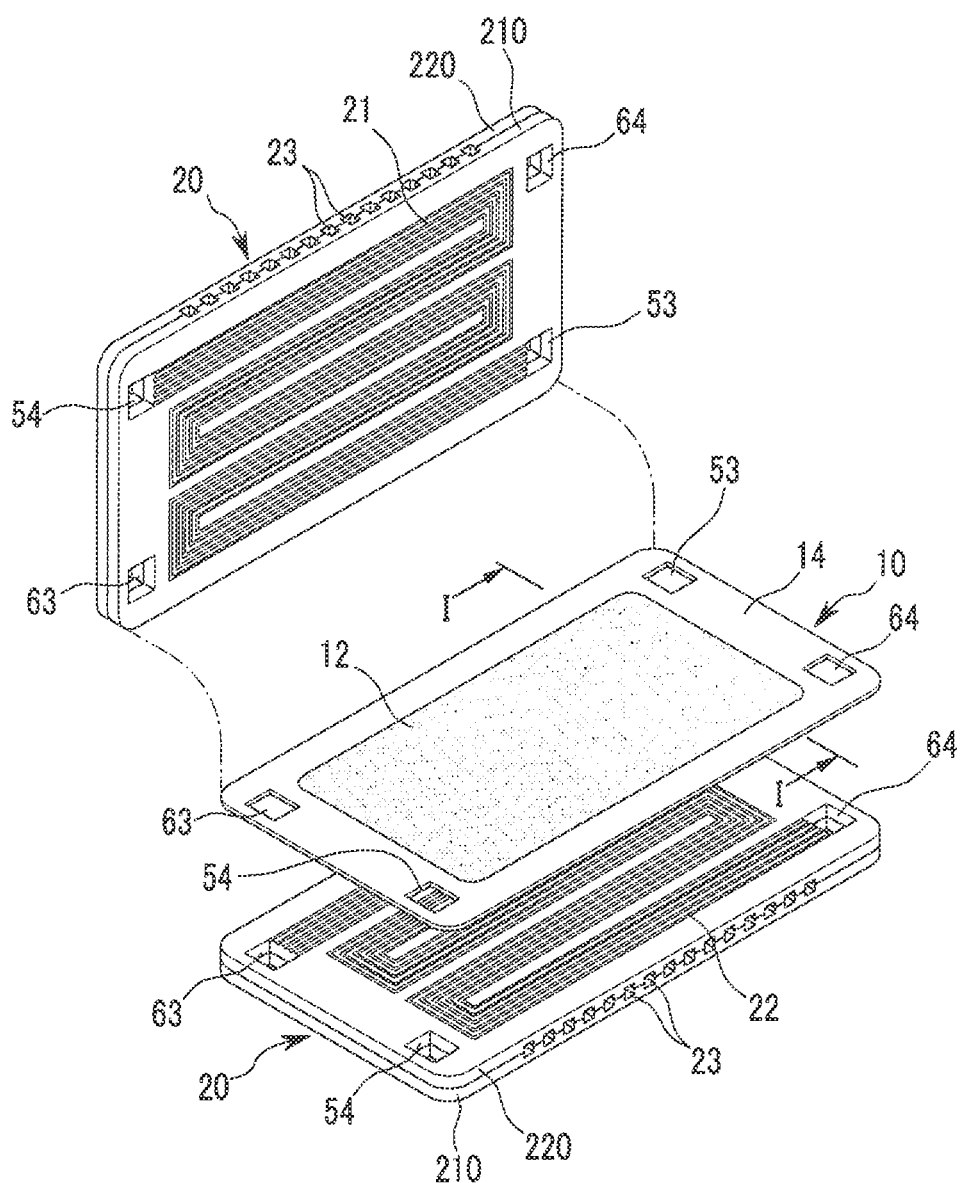
FIG. 2 is an exploded perspective view showing one membrane-electrode assembly and two separators in the fuel cell stack shown in FIG. 1.
Figure 3:
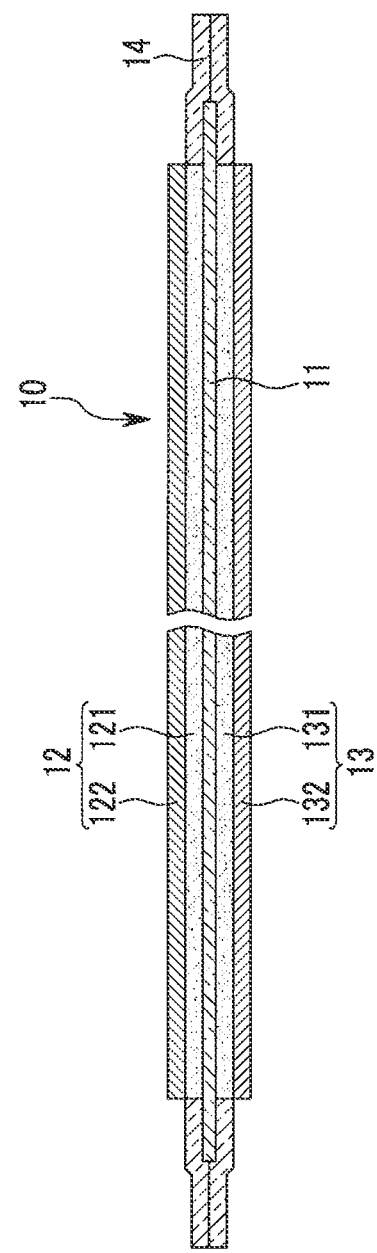
FIG. 3 is a cross-sectional view of the membrane-electrode assembly taken along I-I of FIG. 2.

FIG. 2 is an exploded perspective view showing one membrane-electrode assembly and two separators in the fuel cell stack shown in FIG. 1, and FIG. 3 is a cross-sectional view of the membrane-electrode assembly taken along line I-I of FIG. 2.

Referring to FIGS. 2 and 3, the membrane-electrode assembly 10 includes an electrolyte membrane 11, an anode electrode 12 that is formed at one side or surface of the electrolyte membrane 11, a cathode electrode 13 that is formed at an opposing side or surface of the electrolyte membrane 11, and a supporting film 14 that is fixed along an edge of the electrolyte membrane 11.

The anode electrode 12 is a portion supplied with fuel, and includes a catalyst 121 that converts hydrogen in fuel into electrons and hydrogen ions by an oxidation reaction, and a gas diffusion layer 122 that covers the catalyst layer 121. The cathode electrode 13 is a portion supplied with an oxidant, and includes a catalyst 131 that converts oxygen in the oxidant into electrons and oxygen ions by a reduction reaction, and a gas diffusion layer 132 that covers the catalyst layer 131. The electrolyte membrane 11 has an ion exchange function that moves protons generated in the anode electrode 12 to the cathode electrode 13.

The anode electrode 12 and the cathode electrode 13 are formed to be a smaller size than the electrolyte membrane 11, and the supporting film 14 may be attached to the edge of the electrolyte membrane 11 where the anode electrode 12 and the cathode electrode 13 are not formed. The supporting film 14 suppresses expansion and crease generation of the electrolyte membrane 11 due to moisture adsorption, and it may be mechanically connected with the separators 20.

The separators 20 may be divided into an anode separator 210 that faces the anode electrode 12 and a cathode separator 220 that faces the cathode electrode 13. The anode separator 210 has a fuel channel 21 on one surface toward the anode electrode 12, and the cathode separator 220 has an oxidizing agent channel 22 on one surface toward the cathode electrode 13. The fuel channel 21 and the oxidizing agent channel 22 may be formed as concave grooves. The anode separator 210 and the cathode separator 220 may be integrally bonded to each other, and together are called a bipolar plate.

The anode separator 210, the cathode separator 220, and the supporting film 14 form a fuel inlet manifold 53, a fuel outlet manifold 54, an oxidizing agent inlet manifold 63, and an oxidizing agent outlet manifold 64.

The fuel inlet manifold 53 and the fuel outlet manifold 54 are respectively positioned at the same positions as (e.g., are substantially aligned with) the fuel inlet 51 and the fuel outlet 52. The oxidizing agent inlet manifold 63 and the oxidizing agent outlet manifold 64 are respectively positioned at the same positions as (e.g., are substantially aligned with) the oxidizing agent inlet 61 and the oxidizing agent outlet 62. The fuel channel 21 is connected to the fuel inlet manifold 53 and the fuel outlet manifold 54, and the oxidizing agent channel 22 is connected to the oxidizing agent inlet manifold 63 and the oxidizing agent outlet manifold 64.

A cooling channel 23 may be formed on an inner surface of the anode separator 210 and the cathode separator 220. The cooling channel 23 may be connected with a blowing unit (not shown), and external air may be introduced to the cooling channel 23 via the blowing unit. With the heat exchange between external air and the electrical generator, the temperature of the electrical generator may be decreased. Alternatively, the anode separator 210 and the cathode separator 220 may include a cooling water manifold (not shown), in which cooling water is circulated instead of the above-described air cooling method.

Referring to FIG. 1 and FIG. 2, the fuel that is supplied to the fuel inlet 51 is dispersed into the fuel channel 21 of the anode separators 210 through the fuel inlet manifold 53, and is supplied substantially simultaneously to the anode electrodes 12 of the membrane-electrode assemblies 10. The oxidant that is supplied to the oxidizing agent inlet 61 is dispersed into the oxidant channel 22 of the cathode separators 220 through the oxidizing agent inlet manifold 63, and is supplied substantially simultaneously to the cathode electrodes 13 of the membrane-electrode assemblies 10. Thereby, electrical energy is generated by the electrochemical reaction between the fuel and the oxidizing agent in the membrane-electrode assembly 10.

Non-reacted fuel that is not used in the electrochemical reaction of the membrane-electrode assemblies 10 is discharged to the outside of the fuel cell stack 100 through the fuel outlet 52 via the fuel outlet manifold 54. Non-reacted oxidant that is not used in the electrochemical reaction of the membrane-electrode assemblies 10 and moisture generated as a by-product of the electrochemical reaction are discharged to the outside of the fuel cell stack 100 through the oxidizing agent outlet 62 via the oxidizing agent outlet manifold 64.

The oxidizing agent provided to the oxidizing agent inlet 61 that is not passed through a humidifying device may be external air. Most of this oxidizing agent is in a dry state, such that humidifying may be beneficial. Meanwhile, the non-reacted oxidizing agent that is passed through the electrical generator as a by-product of the electrochemical reaction includes a large amount of moisture.

The moisture supplying flow path 70 of the first end plate 41 in the fuel cell stack 100 of the first exemplary embodiment functions as a moisture moving path toward the oxidizing agent inlet 61 from the oxidizing agent outlet 62. That is, the moisture supplying flow path 70 moves the moisture of the non-reacted oxidizing agent (hereinafter referred to as "discharged oxidizing agent") passing through the oxidizing agent outlet 62, to the oxidizing agent passing through the oxidizing agent inlet 61 (hereinafter referred to as the "supplied oxidizing agent"), thereby functioning to humidify the supplied oxidizing agent.

Figure 4:
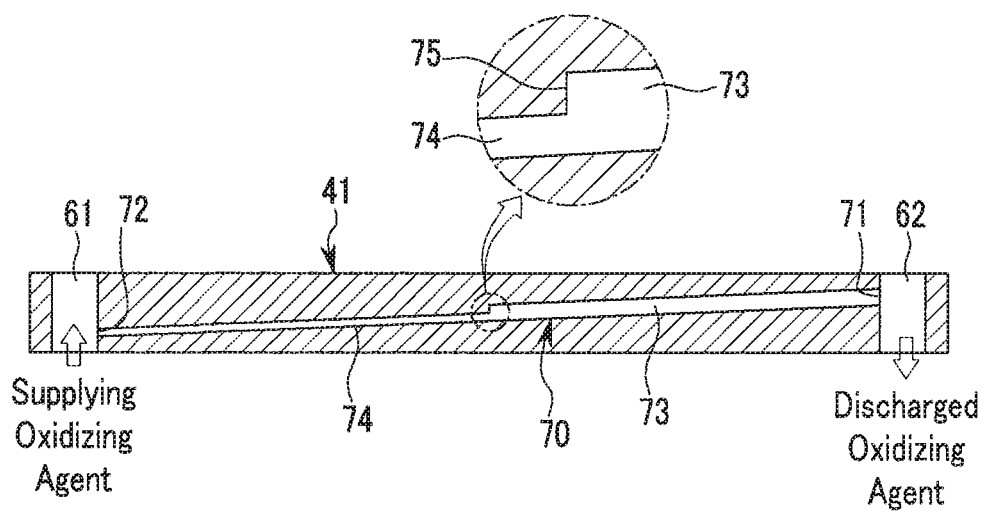
FIG. 4 is a cross-sectional view of a first end plate taken along line II-II of FIG. 1.
Figure 5:
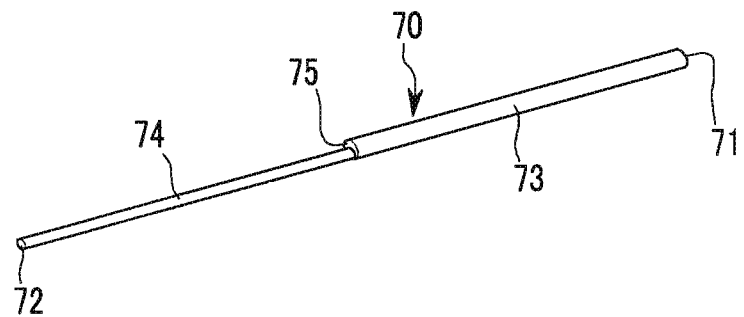
FIG. 5 is a perspective view of a moisture supplying flow path shown in FIG. 4.

FIG. 4 is a cross-sectional view of the first end plate taken along the line II-II of FIG. 1, and FIG. 5 is a perspective view of a moisture supplying flow path shown in FIG. 4.

Referring to FIG. 4 and FIG. 5, the moisture supplying flow path 70 is formed inside the first end plate 41, includes a first end portion 71 contacting the oxidizing agent outlet 62 and a second end portion 72 contacting the oxidizing agent inlet 61, and runs diagonally through the first end plate 41 from outlet 62 to inlet 61. The first end portion 71 contacting the oxidizing agent outlet 62 is larger than the second end portion 72 contacting the oxidizing agent inlet 61. Also, when the first and second end plates 41 and 42 are parallel to a ground surface, the height of the first end portion 71 and the second end portion 72 are different from each other. That is, the first end portion 71 and the second end portion 72 have different heights with respect to the ground surface.

The moisture supplying flow path 70 may be made of at least two flow paths having different diameters. For example, the moisture supplying flow path 70 includes of a first flow path 73 having the same size as the first end portion 71 and a second flow path 74 connected to the first flow path 73 and having the same size as the second end portion 72.

The cross-sections of the first flow path 73 and the second flow path 74 may be circular. If, for example, the cross-sections of the first flow path 73 and the second flow path 74 are shaped to have corners such as with a quadrangle or triangle, moisture may be collected at the corners by the surface tension of the water. Accordingly, the first flow path 73 and the second flow path 74 in the embodiment are circular, such that the movement of the moisture may be easier or more fluid.

The moisture supplying flow path 70 may have a hydrophobic surface. In this case, the movement of the moisture may be more smooth or fluid by decreasing a contact angle of the water with respect to the surface of the moisture supplying flow path 70. A hydrophobic surface may be realized by coating a hydrophobic material on an interior wall of the first flow path 73 and the second flow path 74, or by forming a protruded column on a nanometer (nm) scale on the interior wall of the first flow path 73 and the second flow path 74 through a surface treatment process.

The first flow path 73 and the second flow path 74 may have the same length. On the other hand, the length ratio of the first flow path 73 and the second flow path 74 may be changed according to a pressure and a flow amount of the oxidizing agent. That is, the first flow path 73 may be longer than the second flow path 74, or the second flow path 74 may be longer than the first flow path 73, according to the pressure and the flow amount of the oxidizing agent passing through the oxidizing agent inlet 61 and the oxidizing agent outlet 62.

The center of the moisture supplying flow path 70 may not be curved in any direction, but may be formed in a straight line. Accordingly, the moisture supplying flow path 70 forms the shortest path connecting the oxidizing agent outlet 62 and the oxidizing agent inlet 61, and may be arranged with a substantially uniform slope, where its height with respect to the ground surface is gradually decreased from the first end portion 71 toward the second end portion 72.

In FIG. 5, the first flow path 73 and the second flow path 74 have the same length, and the cross-section of the moisture supplying flow path 70 is circular. However, the cross-section of the moisture supplying flow path 70 and the length of the first and second flow paths 73 and 74 are not limited thereto, and may be any of various different configurations.

In an operation process of the fuel cell stack 100, the supplied oxidizing agent of higher pressure is supplied to and flows in the oxidizing agent inlet 61, and the discharged oxidizing agent of lower pressure and including moisture flows in the oxidizing agent outlet 62. At least some of the moisture included in the discharged oxidizing agent is absorbed in the moisture supplying flow path 70 by the pressure difference and the diameter difference of the first flow path 73 the second flow path 74 such that the moisture is provided to the supplied oxidizing agent.

That is, the moisture included in the discharged oxidizing agent having lower pressure flows easily into the first flow path 73 having a relatively larger diameter, and the collected moisture in the first flow path 73 is absorbed into the second flow path 74 by the higher pressure of the supplied oxidizing agent, such that the moisture is provided or discharged into the supplied oxidizing agent. Here, the second flow path 74 is lower than the first flow path 73 with respect to the ground surface, such that gravity force also has an influence when the moisture of the first flow path 73 is absorbed into the second flow path 74.

The first flow path 73 is larger than the second flow path 74, such that a latch jaw 75 is formed at a boundary region where the first flow path 73 and the second flow path 74 contact each other. This latch jaw 75 has a function of increasing the speed of the moisture that flows into the second flow path 74 from the first flow path 73. Accordingly, the movement of the moisture passing through the moisture supplying flow path 70 may be accelerated by the influence of the gravity force and the speed increase from the latch jaw. The influence by the gravity force may be increased as the slope of the moisture supplying flow path 70 is increased.

Along a lower surface or end of the first and second flow paths 73 and 74 toward a lower surface of the first end plate 41, the moisture supplying flow path 70 may be formed to be straight without a step. In this case, the latch jaw 75 is positioned on an upper surface or end of the boundary region where the first flow path 73 and the second flow path 74 contact each other. The lower end of the first flow path 73 and the second flow path 74 is formed as a straight line such that the moisture of the first flow path 73 is not stagnated at the boundary region and may be instantly or more easily discharged to the second flow path 74.

As described above, the fuel cell stack 100 of the first exemplary embodiment reuses the moisture of the discharged oxidizing agent by using the moisture supplying flow path 70, such that the humidity of the supplied oxidizing agent may be increased. As a result, the whole membrane-electrode assembly 10 may be maintained with a more appropriate humidity, such that deterioration of the membrane-electrode assembly 10 may be suppressed or reduced and the generating efficiency and life-span of the fuel cell stack 100 may be improved. Also, the fuel cell stack 100 does not include an additional humidifying device such that a volume or size of the fuel battery system is small, the manufacturing costs may be decreased, and an increase in the number of components may be minimized.

Figure 6:
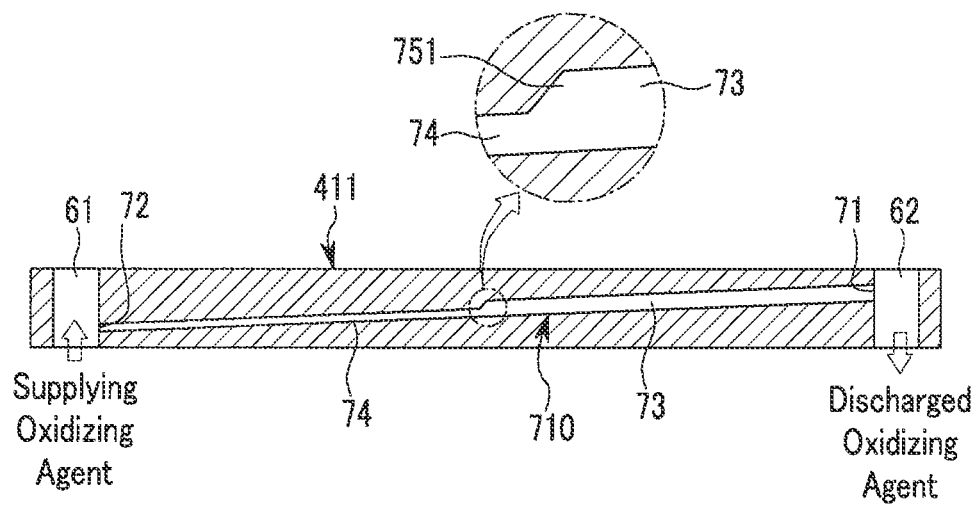
FIG. 6 is a cross-sectional view of a first end plate of a fuel cell stack according to a second exemplary embodiment of the present invention.

FIG. 6 is a cross-sectional view of a first end plate of a fuel cell stack according to a second exemplary embodiment of the present invention.

Referring to FIG. 6, a fuel cell stack in the second exemplary embodiment is the same as the fuel cell stack of the first exemplary embodiment, except in a first end plate 411, a latch jaw 751 of a moisture supplying flow path 710 has a smooth slope along a length direction of the first flow path 73 and the second flow path 74. The same members as in the first exemplary embodiment are indicated by the same reference numerals.

The latch jaw 75 of the moisture supplying flow path 70 in the first exemplary embodiment is substantially perpendicular to the length direction of the first flow path 73 and the second flow path 74, while the latch jaw 751 of the moisture supplying flow path 710 in the second exemplary embodiment forms a smooth angle of less than approximately 45° with respect to the length direction of the first flow path 73 and the second flow path 74. In this case, a phenomenon in which water gathers near the latch jaw may be suppressed or reduced such that the latch jaw 751 having the smooth slope serves to guide the moisture movement.

Figure 7:
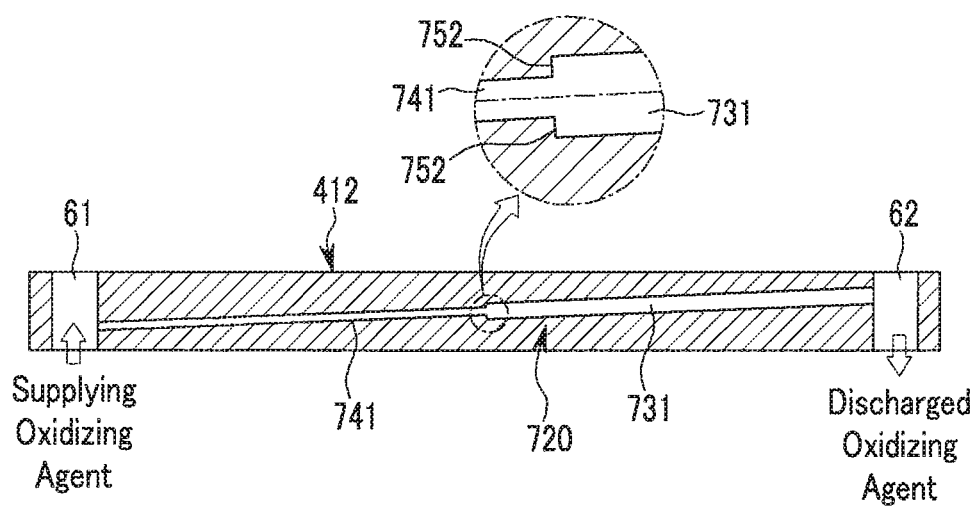
FIG. 7 is a cross-sectional view of a first end plate of a fuel cell stack according to a third exemplary embodiment of the present invention.

FIG. 7 is a cross-sectional view of a first end plate of a fuel cell stack according to a third exemplary embodiment of the present invention.

Referring to FIG. 7, the fuel cell stack of the third exemplary embodiment is the same as the fuel cell stack of the first exemplary embodiment, except that in a first end plate 412, a moisture supplying flow path 720 is formed on a central line or axis of a first flow path 731 and a central line or axis of a second flow path 741 that are substantially aligned with one another. The same members as in the first exemplary embodiment are indicated by the same reference numerals. In FIG. 7, the central line of the first flow path 731 and the second flow path 741 is indicated by a chain line (e.g., broken line). A latch jaw 752 of the moisture supplying flow path 720 in the third exemplary embodiment is formed on a lower portion of the moisture supplying flow path 720 toward a lower surface of the first end plate 412, as well as on an upper portion of the moisture supplying flow path 720.

Figure 8:
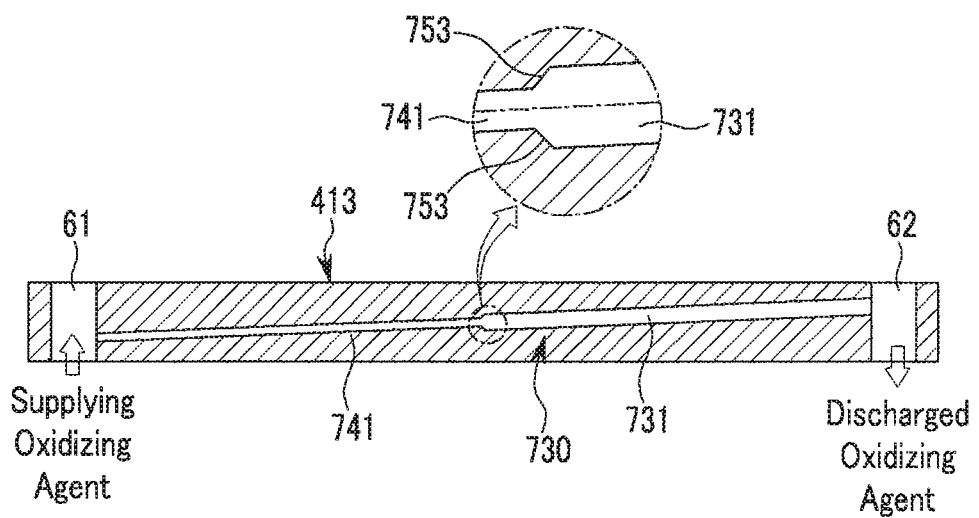
FIG. 8 is a cross-sectional view of a first end plate of a fuel cell stack according to a fourth exemplary embodiment of the present invention.

FIG. 8 is a cross-sectional view of a first end plate of a fuel cell stack according to a fourth exemplary embodiment of the present invention.

Referring to FIG. 8, the fuel cell stack of the fourth exemplary embodiment is the same as the fuel cell stack of the second exemplary embodiment, except that in a first end plate 413, a moisture supplying flow path 730 is formed on a central line or axis of the first flow path 731 and a central line or axis of the second flow path 741 that are substantially aligned with one another. The same members as in the second exemplary embodiment are indicated by the same reference numerals. A latch jaw 753 of the moisture supplying flow path 730 in the fourth exemplary embodiment is formed on a lower portion of the moisture supplying flow path 730 toward a lower surface of the first end plate 413, as well as on an upper portion of the moisture supplying flow path 730.

While this invention has been described in connection with what is presently considered to be practical exemplary embodiments, it is to be understood that the invention is not limited to the disclosed embodiments, but instead is intended to cover various modifications and equivalent arrangements included within the spirit and scope of the appended claims.

What is claimed is:

1. A fuel cell stack comprising:
a plurality of membrane-electrode assemblies;
first and second end plates respectively positioned outside outermost ones of the membrane-electrode assemblies; and
a plurality of separators respectively positioned between the membrane-electrode assemblies and between the outermost ones of the membrane-electrode assemblies and the first and second end plates, for supplying at least one of a fuel or an oxidizing agent to the membrane-electrode assemblies,
wherein the first end plate includes an oxidizing agent inlet, an oxidizing agent outlet, and a moisture supplying flow path connecting the oxidizing agent inlet and the oxidizing agent outlet, the moisture supplying flow path having at least one portion formed inside the first end plate and having a cross-section spaced apart from each outer surface of the first end plate, and
wherein the moisture supplying flow path includes a first end portion adjacent to the oxidizing agent outlet and a second end portion adjacent to the oxidizing agent inlet, the first end portion being larger than the second end portion and being a different distance away from a surface of the first end plate facing away from the second end plate than the second end portion.

2. The fuel cell stack of claim 1, wherein the first end plate is parallel to a ground surface, and a distance between the ground surface and the first end portion is greater than a distance between the second end portion and the ground surface.

3. The fuel cell stack of claim 1, wherein the moisture supplying flow path includes two flow paths having different sizes connected along a length direction of the moisture supplying flow path.

4. The fuel cell stack of claim 3, wherein the moisture supplying flow path includes a first flow path having a same size as the first end portion, and a second flow path connected to the first flow path and having a same size as the second end portion.

5. The fuel cell stack of claim 4, wherein the first flow path and the second flow path have circular cross-sections.

6. The fuel cell stack of claim 4, wherein the first flow path and the second flow path have hydrophobic surfaces.

7. The fuel cell stack of claim 4, wherein the moisture supplying flow path is formed along a straight line at a slope.

8. The fuel cell stack of claim 7, wherein lower surfaces of the first flow path and the second flow path are aligned, and a latch jaw is formed on an opposite surface of a boundary region where the first flow path and the second flow path are connected to one another.

9. The fuel cell stack of claim 8, wherein the latch jaw is perpendicular to a length direction of the first flow path and the second flow path.

10. The fuel cell stack of claim 8, wherein the latch jaw has a slope of less than or equal to 45° with respect to a length direction of the first flow path and the second flow path.

11. The fuel cell stack of claim 7, wherein the moisture supplying flow path is formed such that a central axis of the first flow path and a central axis of the second flow path are aligned with one another, such that a latch jaw is formed on at least two opposite surfaces of a boundary region where the first flow path and the second flow path are connected.

12. The fuel cell stack of claim 11, wherein the latch jaw is perpendicular to a length direction of the first flow path and the second flow path.

13. The fuel cell stack of claim 11, wherein the latch jaw has a slope of less than or equal to 45° with respect to a length direction of the first flow path and the second flow path.

14. The fuel cell stack of claim 2, wherein the first end plate is positioned closer to the ground surface than the second end plate, and the oxidizing agent inlet and the oxidizing agent outlet are arranged to be diagonal to one another on the first end plate.

15. The fuel cell stack of claim 1, wherein the first end portion is farther away from the surface of the first end plate facing away from the second end plate than the second end portion.

* * * * *